United States Patent [19]

Bianchi

[11] Patent Number: 4,615,354

[45] Date of Patent: Oct. 7, 1986

[54] VALVE SYSTEM TIMING DEVICE FOR PIPES CARRYING LIQUID UNDER PRESSURE

[75] Inventor: Costanzo Bianchi, Milan, Italy

[73] Assignee: S.I.G.M.A. - Societa Idraulica Generale Macchine Accessori, Milan, Italy

[21] Appl. No.: 611,272

[22] Filed: May 17, 1984

Related U.S. Application Data

[63] Continuation-in-part of Ser. No. 262,257, May 8, 1981, abandoned.

[30] Foreign Application Priority Data

May 8, 1980 [IT] Italy ................. 21899 A/80

[51] Int. Cl.[4] .................................. F16K 1/00
[52] U.S. Cl. ............................. 137/110; 137/629; 137/630.14; 251/25; 251/63.5
[58] Field of Search ............ 137/629, 630.14, 630.15; 251/25, 63.5, 120

[56] References Cited

U.S. PATENT DOCUMENTS

| | | | |
|---|---|---|---|
| 680,852 | 8/1901 | Foster | 251/25 |
| 948,445 | 2/1910 | Golden | 251/63.5 X |
| 2,333,455 | 11/1943 | Warren | 137/630.14 X |
| 2,888,953 | 6/1959 | Gratzmoller | 137/630.15 |
| 3,166,500 | 1/1965 | Noakes | 251/120 X |
| 3,631,888 | 1/1972 | Anton | 137/630.15 X |
| 3,631,894 | 1/1972 | Frantz | 137/630.15 |
| 4,075,928 | 2/1978 | Bitonti | 137/110 X |

FOREIGN PATENT DOCUMENTS

| | | | |
|---|---|---|---|
| 287719 | 3/1928 | United Kingdom | 137/630.15 |
| 216400 | 9/1968 | U.S.S.R. | 137/630.15 |

*Primary Examiner*—Robert G. Nilson
*Attorney, Agent, or Firm*—Collard, Roe & Galgano

[57] ABSTRACT

A valve system timing device for pipes carrying fluid under pressure operable to control a fluid, so as to define an upstream and a downstream fluid pipe includes a first or by-pass shutter provided with a modulating flowrate limiting device for slowly pressurizing the downstream fluid pipe, a second or operating shutter operable in a self-actuating manner, and an actuator operated by the fluid under pressure, and opening the operating shutter when the differential pressure between the upstream and downstream pipes is decreased.

5 Claims, 8 Drawing Figures

VALVE SYSTEM TIMING DEVICE FOR PIPES CARRYING LIQUID UNDER PRESSURE

REFERENCE TO EARLIER APPLICATION

This application is a continuation-in-part of my earlier filed U.S. patent application Ser. No. 262,257, filed May 8, 1981 now abandoned.

BACKGROUND OF THE INVENTION

1. Field of the Invention

The present invention relates to a valve system timing device, including at least a shut-off member, for pressure fluid pipes. More particularly, it relates to a valve system timing device for pressure fluid pipes having the purpose of avoiding, at the opening and at the closing steps, the occurrence in the system of any dangerous water hammers, even though the pressure in the upstream pipe changes considerably, and a pressure gradient occurs in the downstream pipe so as to result in a non-negligible positive or negative difference in height with respect to the shut-off member.

2. Description of the Prior Art

It is well known that a shutting-off member, placed along a water (or other liquid) pipe under pressure, should be operated by a person of particular skill to avoid the occurrence of any overpressure (water hammers) which are extremely dangerous to the whole system (pipes, pumps, valves, etc.). The handling becomes particularly delicate when the initially empty pipe section downstream of the shut-off member is provided with one or more nozzles such as, for example, a sprinkler's line in an irrigation system or, more generally, with conventional air vents.

While it will suffice at the closing step, in order to avoid the "water hammer", to carry out handling of the shut-off member sufficiently slowly, at the opening step it is essential to operate in two well defined steps.

The first step, and by far the most sensitive step, referred to as "pressurization" of the downstream pipe, consists of slowly filling up completely the downstream pipe with liquid, and displacing any residual air contained therein.

Such an operation should be carried out extremely slowly. Thus, as shown by significant studies and operative experience, at the time when the outflow of air from the nozzles ceases, and liquid starts to flow out, due to the sudden and great change in density of the fluid flowing in the pipe, for well known reasons the phenomenon of "water hammer" would occur, if the outflow rate were not sufficiently small.

Therefore the second step, consisting of gradual slow opening of the shut-off member, should take place only after completion of the first step.

Usually, such an "intelligent" handling is manually performed by the operator: at the first step by opening a by-pass device positioned upstream and downstream of the shut-off member, or by opening in a small degree the shut-off member; and the second step by gradually opening the shut-off member completely. There are commercially available shut-off members consisting of two shutters, the first of which is gradually opened, and the second of which may be opened only upon the occurrence of a predetermined downstream back-pressure; but this occurs only when the upstream pressure has quite constant values, and when particular positive or negative slopes or gradients are not present in the downstream position.

Therefore, this known device is not independent of any upstream pressure variations, and for any downstream gradients or slopes. U.S. Pat. No. 2,888,953 discloses a device for timing the operation of the valve system interposed in a liquid utilization circuit between a source of liquid under pressure, and a pressure-liquid receiving line.

The disclosed device includes a chamber of a predetermined volume, a first conduit means between the source and the chamber, and a second conduit means between the source and the line.

Calibrated and preferably sharp-edged calibrated restriction means are interposed in both the first and second conduit means so as to be effective to maintain similar flow characteristics therein, and valve means are operatively associated with the conduit means and operable when open to establish two liquid flows.

Therefore, the flow is reduced for the first time, while it is higher in the second time, when another conduit means is open. This patent recites, therefore, a valve system controlled by a liquid pressure responsive valve actuating piston for ensuring two different rates of feeding of a utilization circuit.

Furthermore, in the device of the U.S. Pat. No. 2,888,953, the main valve opens only after a fixed and constant volume of liquid (U) is located in the downstream pipe. This volume (U) is proportional only to the length of the stroke of the valve actuating piston and to the cross-section of the same piston.

Therefore, this volume U is not automatically variable depending on the characteristic (length, size, slope) of the liquid receiving line. This disclosed device, therefore, does not make possible to avoid or prevent the occurrence in the system of any dangerous water hammers.

SUMMARY OF THE INVENTION

One object of the present invention is to provide a remotely controlled or remotely controllable shut-off member for pressure fluid pipes, which makes it possible to avoid any water hammer, even when the pressure in the upstream water pipe is widely varied, and when in the downstream pipe there occurs such a gradient or slope as to develop a positive or negative pressure difference thereacross.

According to the present invention, the above and other objects are achieved by a remotely controlled or remotely controllable shut-off member comprising two shutters or valves, dependent on one another and acting along a single axis, or along two independent axes; a first shutter, referred to as a by-pass shutter, is provided with a modulating flowrate limiting device for slowly pressurizing the downstream fluid pipe, and a second shutter, referred to as an operating shutter, is provided for carrying out the operation in a selfactuating manner.

An actuator or actuators, operated by the pressure fluid, opens or open the operating shutter when the differential pressure between the upstream and downstream pipes is decreased.

DESCRIPTION OF THE DRAWINGS

The present invention may be more clearly understood by the following description, which refers to the drawings illustrating preferred embodiments of the present device, wherein.

DESCRIPTION OF THE PREFERRED EMBODIMENTS

In the Figures, means performing the same functions both in examples A and B, are designated by the same reference numerals. With reference to the Figures of the drawings, the self-actuating remotely controlled or remotely controllable shut-off member for pressure fluid pipes includes two shutters or valves—namely, a first shutter 1, referred to as a by-pass shutter or valve, and a second shutter or valve, referred to as an operating shutter or valve 2. The shutters or valves 1 and 2 are controlled by a single hydraulic actuator 3 in example A of FIGS. 1, 2 and 3, and by two hydraulic actuators 3 and 4 in example B of FIGS. 5, 6 and 7.

In turn, the hydraulic operators or actuators are operated at the opening step by the pressure of fluid in the upstream pipe, introduced into the relative cylinders 5 after passing the filter 6 through a three-way valve 7, which is manually and/or remotely controlled by electrical pulses or by a pressure fluid, and at the closing step by the pushing action of springs 8 located under the shutters, and then by the upstream fluid pressure exerted on the shutters.

Such pushing actions are sufficient to eject the fluid from the chamber of the hydraulic actuators which at closing step communicate with the atmosphere by means of the three-way valve 7. The by-pass shutter 1 has the function of performing at the opening step the first stage of the above described operation, referred to as "pressurization" of the downstream pipe.

The three ways of the valve 7 are:
the inlet (a) of the fluid;
the outlet (b) of the fluid towards the actuator, and
the exhaust passage (c).

As mentioned above, at the opening step the effluent flowrate should be maintained at a very low value but lower than a predetermined value in order to avoid the occurrence of a "water hammer" which is dangerous for the system.

But, since such a flowrate (which depends on the differential pressure between the upstream and downstream pipe sections and accordingly on the pressure of the upstream pipe which is in turn susceptible of considerable pressure variations depending on the operating conditions, the height of the hydraulic valve from the ground, etc.) could, as a result, undergo substantial variations, the by-pass shutter 1 has been provided with a self-acting modulating flowrate limiting device 9, which is capable of maintaining at this step the effluent flowrate within a predetermined range, independently of the variations in pressure of the upstream water pipe.

The flow limiting device 9 is integral with operating shutter 2 of example A and maintains the flow rate through the by-pass defined by bypass shutter 1 and independent from the pressure difference between the upstream and the downstream.

Any flow limiting devices known may be used, such as the DOLF$^R$ flow control or that described in Italian Pat. No. 1,054,535.

The controlling mechanism of the known flow limiting devices consists of a flexible or elastic orifice that varies its area inversely with the pressure difference between up and down-streams so that a nearly constant flow rate is maintained. The flow limiting device 9 illustrated in the drawings is constituted by a ring made of rubber or other elastic material and provided with a projecting rim or lip 9'. When the pressure difference between the upstream and the downstream of the ring increases with respect to the predetermined nominal flow rate, the rim 9' bends inwardly reducing the orifice area and, therefore, the flow-rate.

In the examples A and B, the flow limiting device 9 forms the seat for the by-pass shutter 1, but could also be otherwise housed; it is essential that it limits the flowrate which flows out from the by-pass shutter at the step of "pressurizing" the downstream pipe within the predetermined value.

Figure 1:
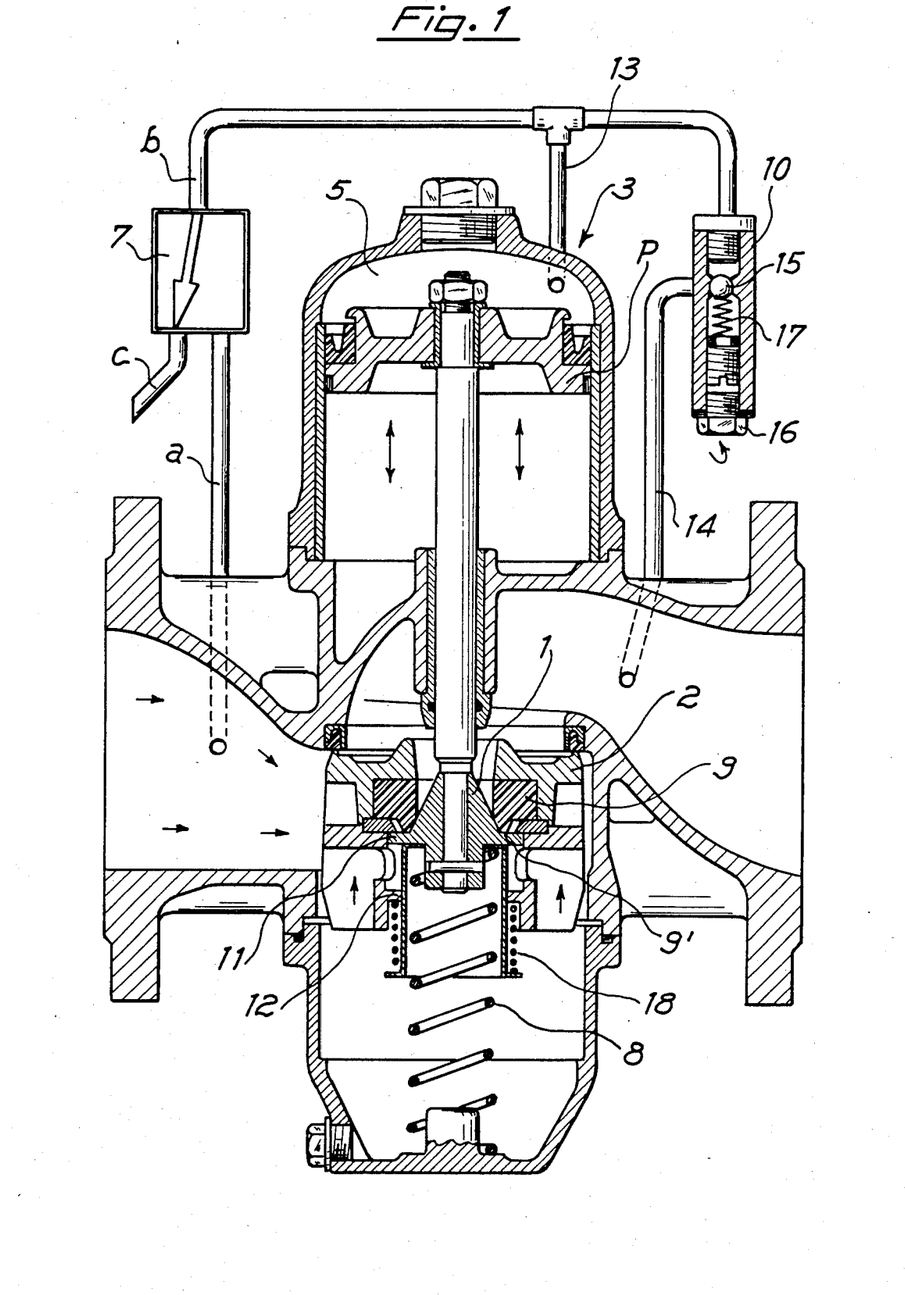
FIG. 1 is a cross-sectional view of an embodiment of the hydraulic valve of the present invention, (referred to as example A) shown in the closed position.
Figure 2:
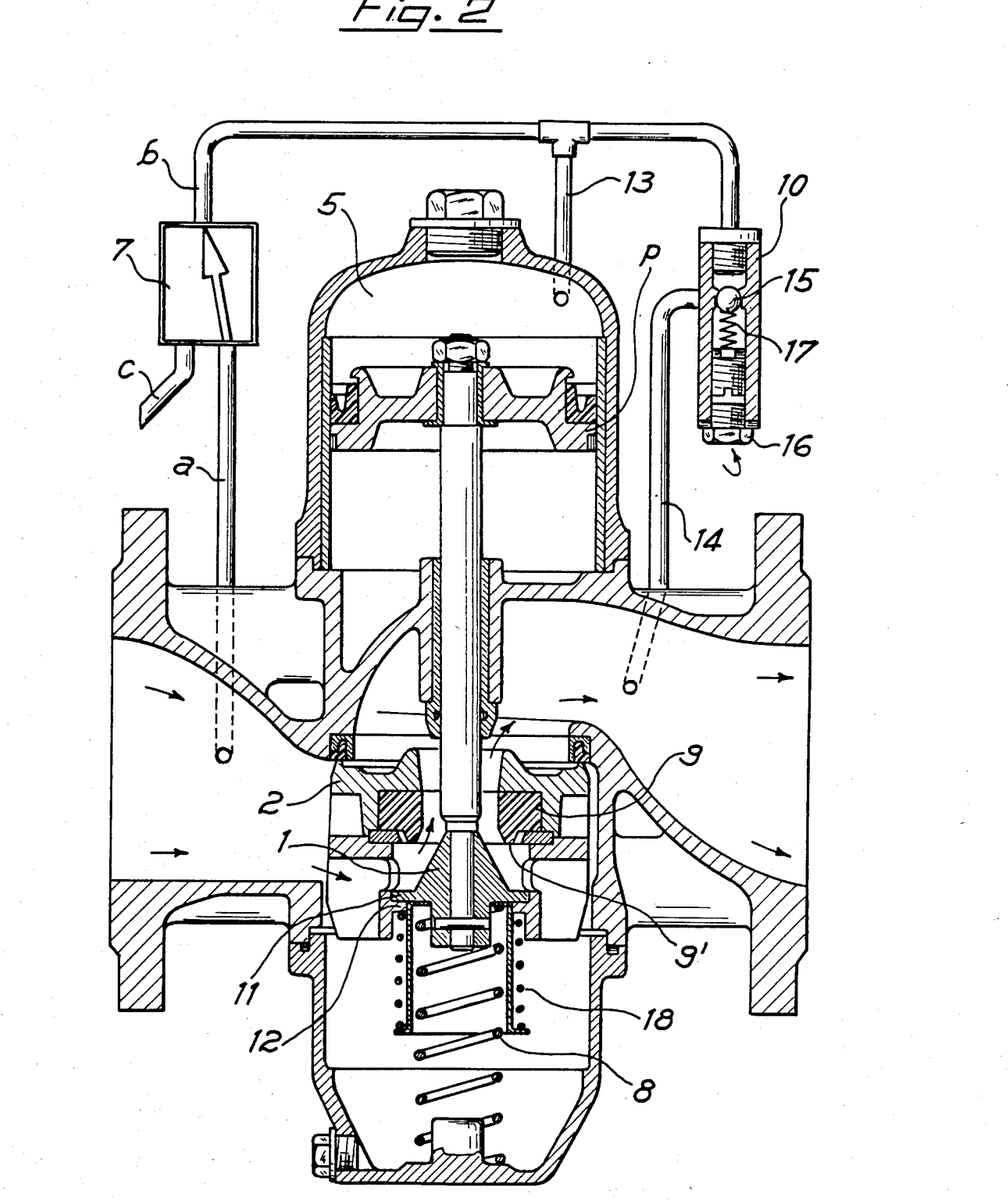
FIG. 2 is a cross-sectional view of the embodiment of the hydraulic valve of FIG. 1, shown in the bypass mode.
Figure 3:
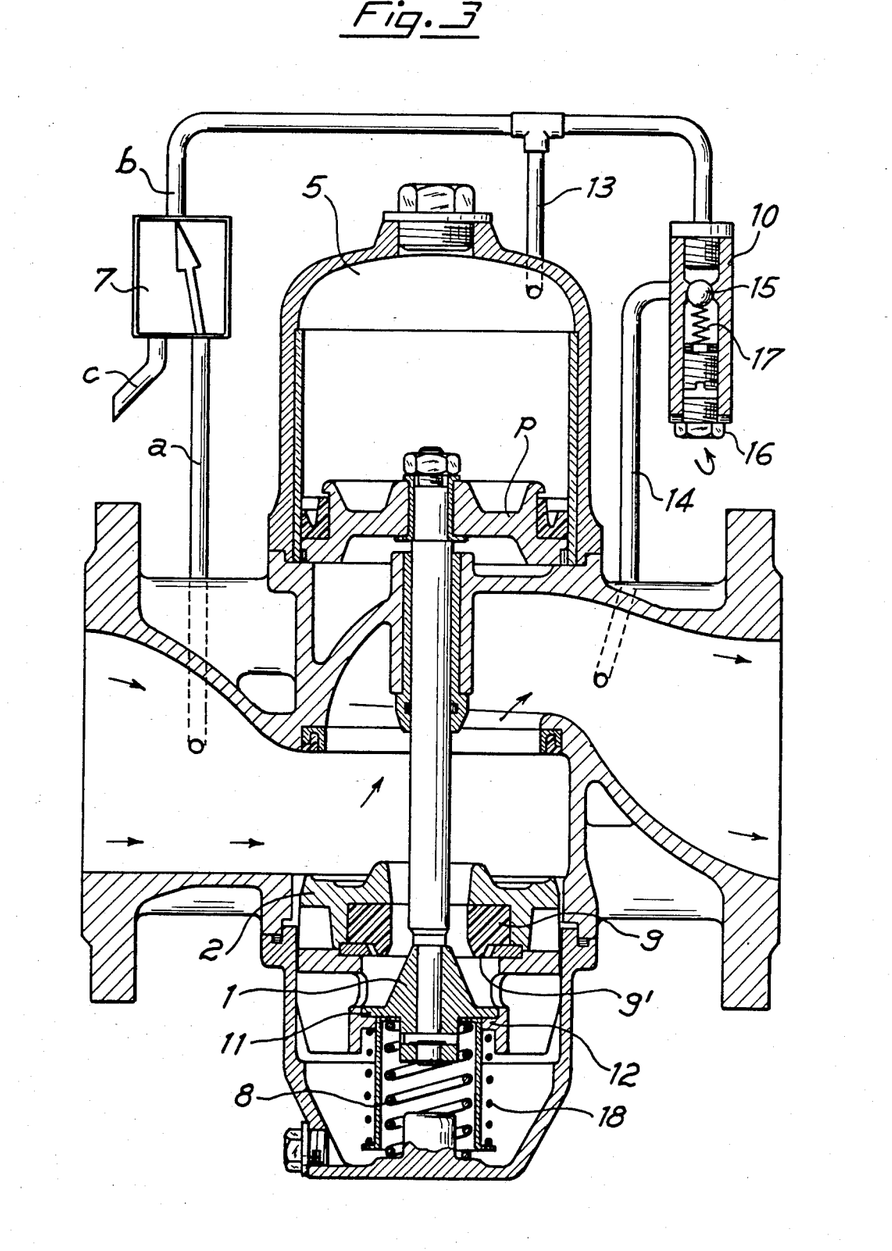
FIG. 3 is a cross-sectional view of the embodiment of the hydraulic valve of FIG. 1, shown in the open mode.
Figure 4:
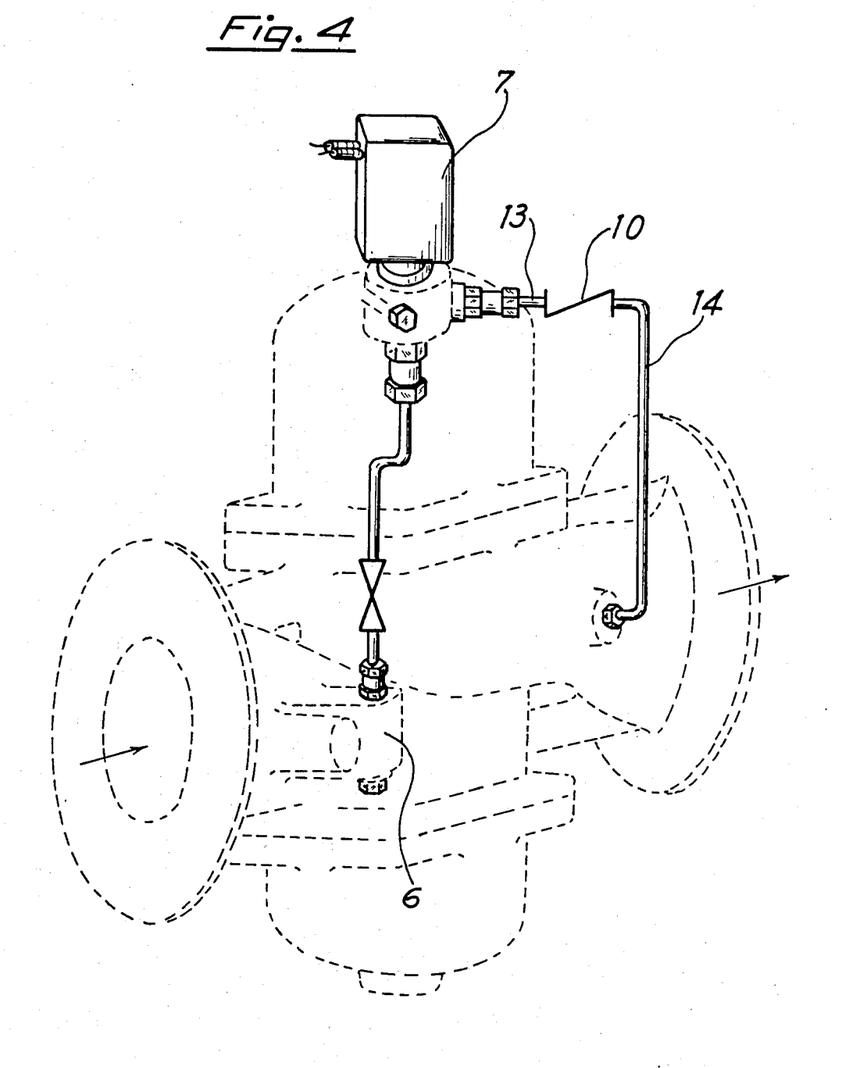
FIG. 4 is a schematic view of the hydraulic valve of FIG. 1, particularly showing the application of the adjusting device.
Figure 5:
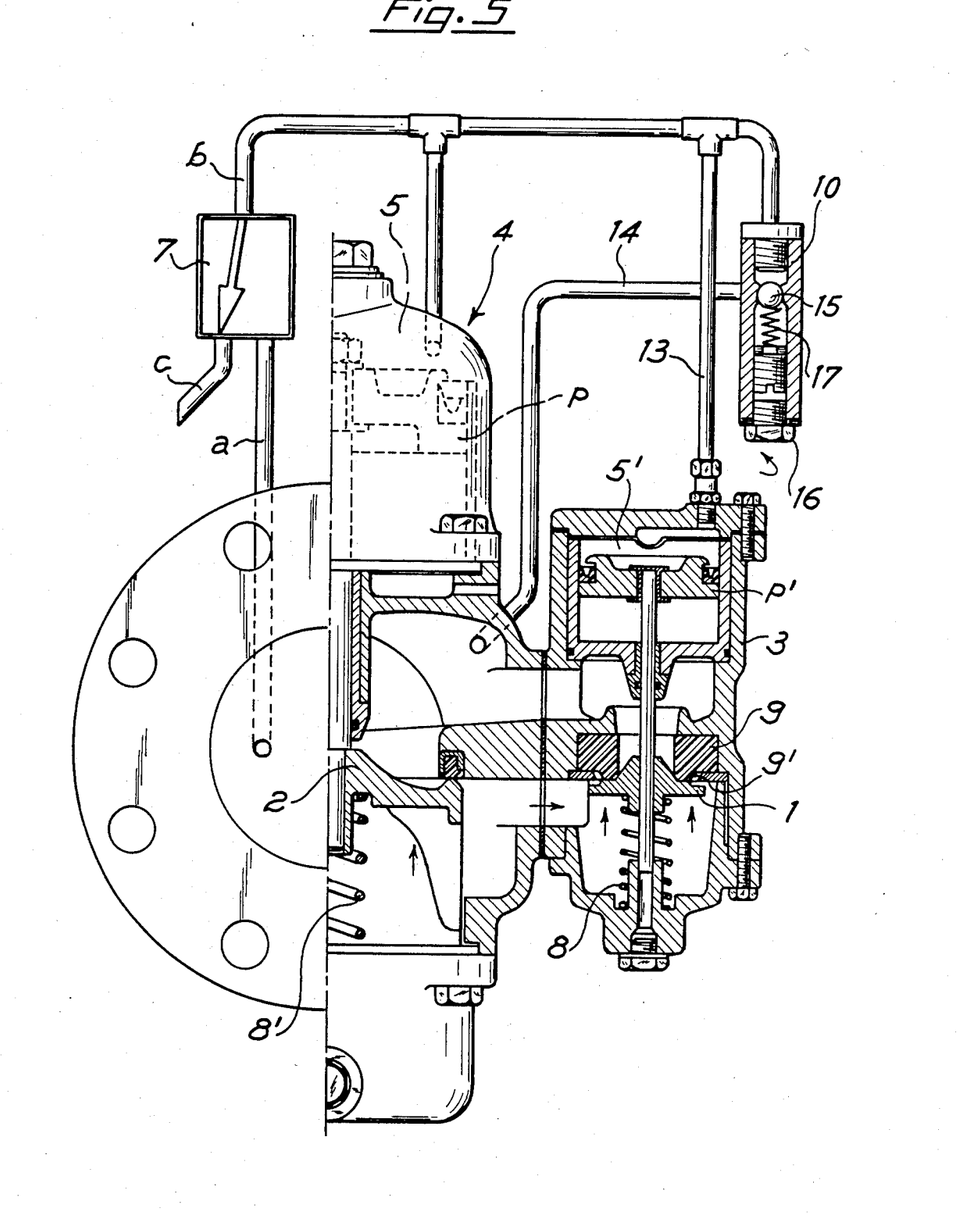
FIG. 5 is a cross-sectional view of another embodiment of the hydraulic valve of the present invention (referred to as example B), shown in the closed position.
Figure 6:
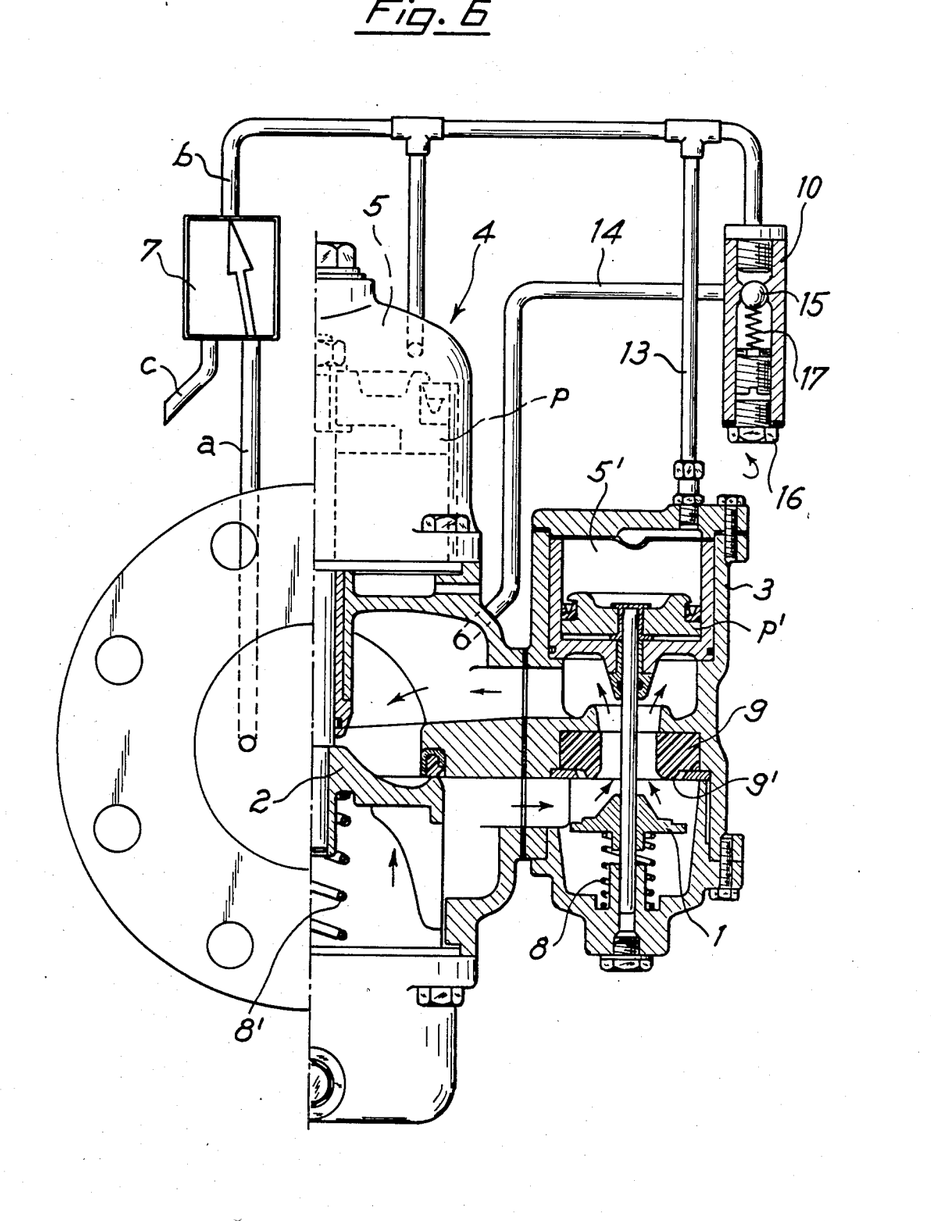
FIG. 6 is a cross-sectional view of the embodiment of the hydraulic valve of FIG. 5, shown in the by-pass mode.
Figure 7:
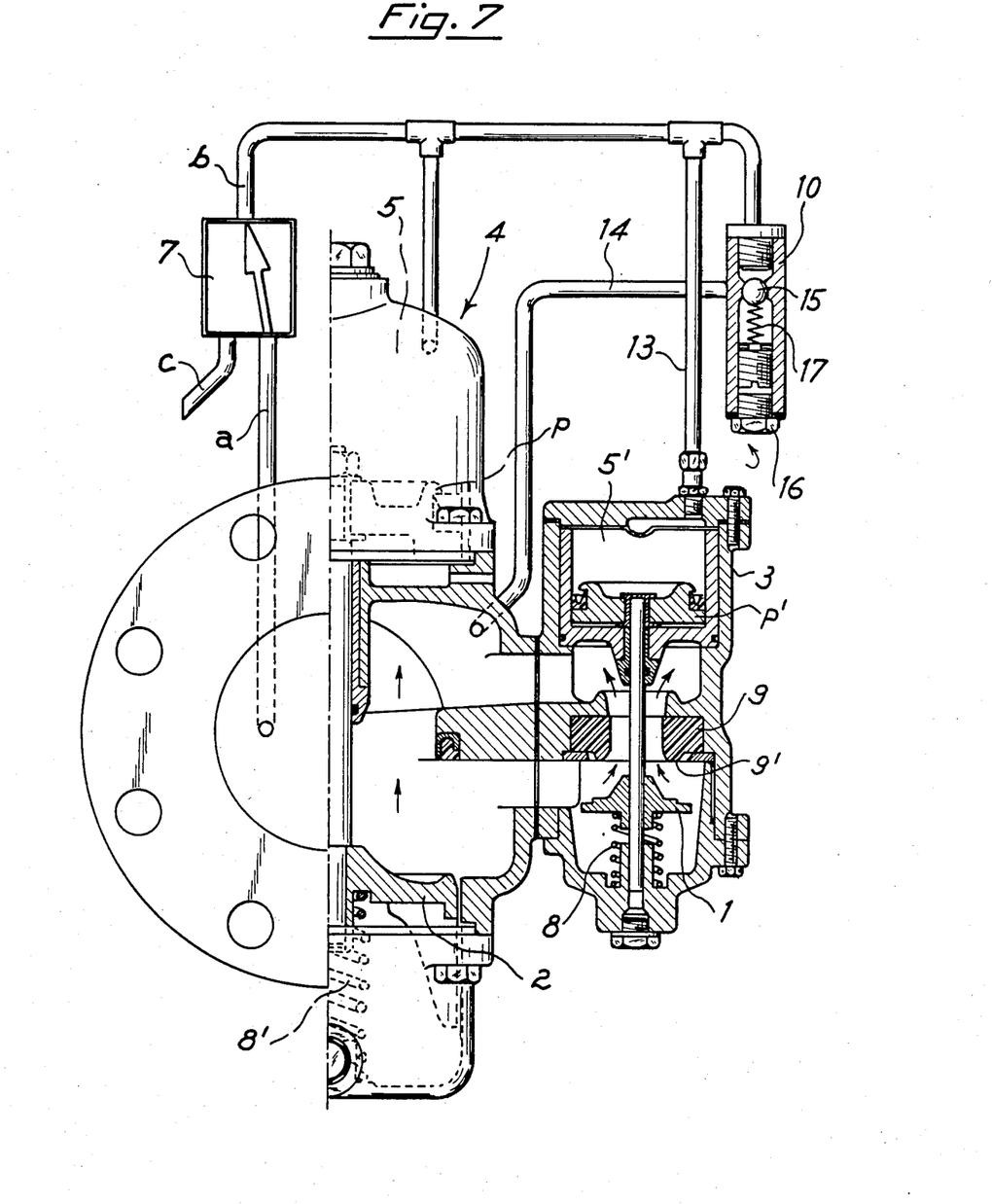
FIG. 7 is a cross-sectional view of the embodiment of the hydraulic valve of FIG. 5, shown in the open mode.
Figure 8:
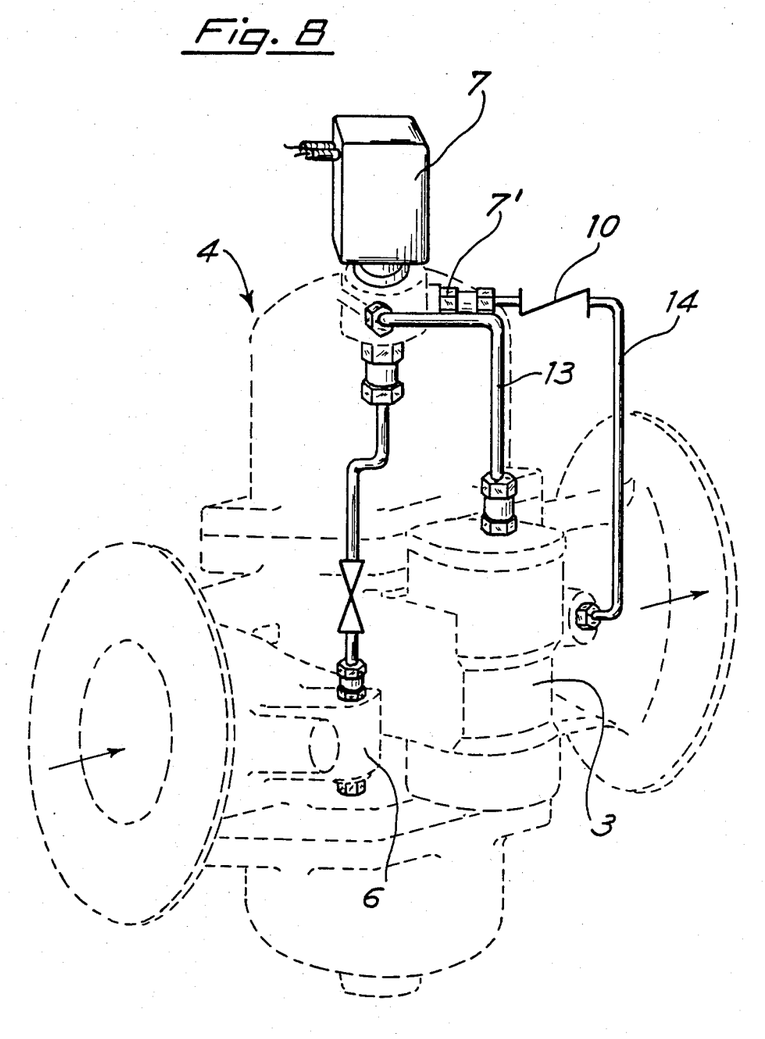
FIG. 8 is a schematic view of the hydraulic valve of FIG. 5, particularly showing the application of the adjusting device.

The by-pass shutter 1 can be arranged separately from the operating shutter 2, as in FIGS. 5, 6 and 7, or, it can be connected concentrically with the latter (in this case the actuator 3 is unique for the two shutters), as in FIGS. 1, 2 and 3. However, the operating shutter 2 is seated in the actual hydraulic valve.

The operating shutter 2 remains closed for a suitable time, depending on the geometrical and hydraulic characteristics of the downstream pipe, until the reduced flowrate flowing from the by-pass shutter 1 has completely filled the downstream pipe.

Only then and not before, due to the back-pressure generated in the downstream pipe and the resulting decrease in the differential pressure between the upstream and downstream sections, will operating shutter 2 slowly start to gradually open, and accordingly deliver the flowrate as required by the system, which is by far higher than that flowing out from the by-pass shutter 1.

The opening of the operating shutter 2 in example B is effected by the relative actuator 4, whereas in example A such an opening is effected by the single actuator 3 through the by-pass shutter 1, which is provided with a mechanical abutment with the operating shutter 2. The mechanical abutment is in the form of an annular extension, designated 11, on by-pass shutter 1 which engages with an annular step 12 formed in the end part of operating shutter 2.

The opening of the operating shutter 2, only upon achieving a predetermined back-pressure in the downstream water pipe, could be simply obtained by a suitable sizing of the actuator 4 in example B or of single actuator 3 in example A.

In this case however the effectiveness of the invention would be limited to only moderate positive or negative differences in height of the downstream water pipe. Since, as mentioned above, it is a further object of the present invention is to solve the problem even when there occur in the downstream pipe such slopes or gradients as to result in a non-negligible difference in height with respect to the shutting off member, the invention has been provided with an adjusting device, comprising adjustable check valve 10 which is inserted in a connection between the actuator chamber 5 through the connection means 13 and to the downstream water pipe by the connection means 14.

The check valve 10 is merely a device in the means for controlling the actuator 5 which includes a hydraulic pressure control system and the check valve merely operates to prevent backflow into actuator 5 when it is desired to close the hydraulic valve and to act as a triggering device to fully pressurize actuator 5 at a predetermined pressure differential.

Thus, such a check valve is only necessary when this means for controlling actuator 5 is dependent on a hydraulic system for measuring the pressure differential between the upstream and downstream sides of the pressure pipe. The check valve 10 is a standard type of device and includes an adjustable ball valve 15 which is adjusted by means of a screw 16 which varies the tension on the spring 17 which maintains the ball closed on its valve seat.

By means of the adjustment of the valve 10, depending on the difference of height between the hydraulic valve and the downstream pipe, the required pressure in the actuator chamber 5 is provided, as a function of the downstream back-pressure, so as to open the operating shutter 2 only when the desired back-pressure has been established in the downstream pipe, and accordingly the predetermined value of the differential pressure between the upstream and the downstream pipe portions and related to the operating shutter 2.

It is a further feature of the invention that, when the valve is fully open, all the shutters are positioned outside of the liquid flow (see FIGS. 3 and 7). This is particularly advantageous to avoid obstructions resulting from any suspended solid bodies, or wear of the shutters and relative springs due to possible sand carried by the liquid flow.

For cutting off flow, it will suffice to move the three-way valve 7 back to the exhaust passage C (actuator chamber 5 in communication with atmosphere).

In this position, the check valve 10 will close, and the spring 8 will start to slowly close the operating shutter 2, while the by-pass shutter 1 will remain open and this, in example B, will occur due to the difference in the speficic load, to which the two actuators 3 and 4 are subjected by the respective springs 8 and the upstream load and, this will occur in example A, due to the spring 18 disposed between the two shutters.

On complete closure of the operating shutter 2, the by-pass shutter 1 will slowly start gradually to close.

The remotely controllable hydraulic valve could be also manually controlled on site by acting on the three-way valve 7 for a normal operation.

With references to FIGS. 1 to 3 the operating modes of the embodiment of example A will now be described. In FIG. 1, it will be seen that because three-way valve 7 is directed to the exhaust or overflow passage "c", no pressure is exerted by the fluid in actuator chamber 5 and, therefore, both by-pass shutter 1 and operating shutter 2 are closed. When it is desired to operate the hydraulic valve, three-way valve 7 is activated (see FIG. 2) so that the inlet tube "a" connected to the upstream of the fluid pressure pipe is in communication with outlet tube "b" which in turn communicates with actuator chamber 5 and with check valve 10. In this manner, fluid pressure is exerted on the piston P in chamber 5 thereby opening by-pass actuator 1 against the biasing action of spring 8, up to annular extension 11 engaging the annular step 12. Thus, the by-pass valve 1 is open allowing the pressure fluid to flow therethrough and be regulated by flow rate limiting device 9, as clearly seen by the arrows in FIG. 2. The fluid enters into the downstream side of the fluid pressure pipe and when the pressure difference between the downstream and upstream sides has reached a predetermined level or is equalized, which is set by means of the adjustment of check valve 10, the full pressure of the fluid is exerted on the piston P in actuator chamber 5 which is then driven downwardly against the action of springs 8 and 18 to thereby open operating shutter 2 (as clearly seen in FIG. 3), by the pressure of the annular extension 11 on the annular step 12.

When it is desired to shut off the flow to the downstream side of the system, the three-way valve 7 is actuated so as to deliver the fluid in tube "b" to the exhaust passage or tube "c" and close the inlet tube "a".

When this occurs, check valve 10 is closed by means of the spring pressure therein, thus shutting off any backflow from the downstream connection 14 and the fluid pressure in tube "b" and actuator chamber 5 is thereby relieved.

This permits piston P to return under the actuation of springs 8 and 18 so that operating shutter 2 is seated and as the pressure acting on piston P is reduced, by-pass shutter 1 also becomes seated due to the action of spring 8.

With reference to FIGS. 5 to 7, the operating modes of the embodiment of example B will now be described. In FIG. 5, it will be seen that because three-way valve 7 is directed to the exhaust passage (c) no pressure is exerted by the fluid in actuator chambers 5 and 5' and, therefore, both by-pass shutter 1 and operating shutter 2 are closed. When it is desired to operate the hydraulic valve, three-way valve 7 is activated (see FIG. 6) so that the inlet tube "a" connected to the upstream of the fluid pressure pipe is in communication with outlet tube "b" which in turn communicates with actuator chambers 5 and 5' and with check valve 10. In this manner, fluid pressure is exerted on the piston P' in chamber 5' thereby opening by-pass actuator 1 against the biasing action of spring 8. Thus, the by-pass valve 1 is open allowing the pressure fluid to flow therethrough and be regulated by flow rate limiting device 9, as clearly seen by the arrows in FIG. 6. The fluid enters into the downstream side of the fluid pressure pipe and when the pressure difference between the downstream and upstream sides has reached a predetermined level or is equalized, which is set by means of the adjustment of check valve 10, the full pressure of the fluid is exerted on the piston P in actuator chamber 5 which is then driven downwardly against the action of spring 8' to thereby open operating shutter 2, as clearly seen in FIG. 7. When it is desired to shut off the flow to the downstream side of the system, the three-way valve 7 is actuated so as to deliver the fluid in tube "b" to the exhaust passage or tube "c" and close the inlet tube "a".

When this occurs, check valve 10 is closed by means of the spring pressure therein, thus shutting off any backflow from the downstream connection 16 and the fluid pressure in tube "b" and chambers 5 and 5' is thereby relieved.

This permits pistons P and P' to return under the actuation of springs 8 and 8' so that operating shutter 2 and by-pass shutter 1 are seated. Finally, it should be particularly pointed out that, owing to the concept of its operation, in case of any lack of pressure in the upstream pipe, the hydraulic valve would close on its own without any need for remote control or manual control on site.

Any other embodiment, in accordance with the same inventive concepts, or carrying into effect even in a different combination of the features of the present invention, would be within the scope of the invention, as well as within the field of any patent issued, based on the present application.

What we claim is:

1. A hydraulic valve operable to control a fluid flow so as to define an upstream portion and a downstream portion, at least an initial differential pressure prevailing between said portions, said downstream portion having predetermined geometrical and hydraulic characteristics, comprising in combination:
   (a) an operating shutter;
   (b) a by-pass shutter including a flow-rate limiting means for controlling the flow-rate through said by-pass shutter independent of the pressure difference between said upstream and downstream portions, said flow-rate limiting means forming the valve seat for said by-pass shutter and having a flexible orifice that varies in area inversely with the pressure difference between said upstream and downstream portions, said flow-rate limiting means being integral with said operating shutter;
   (c) engagement means associated with said by-pass shutter for engaging with a complementary means associated with said operating shutter to cause said operating shutter to open upon a defined opening of said by-pass shutter;
   (d) a fluid-pressure operated actuator for controlling the opening and closing of said operating and by-pass shutters, said actuator being operatively connected to said by-pass shutter to cause the same to open gradually due to the initial pressure in said upstream portion and to open fully upon a predetermined pressure in said downstream portion;
   (e) a three way valve having an inlet connected upstream of said hydraulic valve, an outlet connected to said fluid-pressure operated actuator and an exhaust, so as to operate said actuator when said inlet and said outlet are in communication with one another;
   (f) a chamber for housing said actuator; and
   (g) a connecting pipe connecting said actuator chamber to said downstream portion, said connecting pipe including an adjustable check valve blocking any return flow from said downstream portion to said actuator chamber, whereby the pressure in said actuator chamber is adjustable even during the existence of any positive or negative pressure differential between said actuator chamber and said downstream portion.

2. The hydraulic valve as claimed in claim 1, wherein the check valve comprises an adjustable ball valve, a spring which maintains the ball closed on its valve seat, and a screw which varies the tension on the spring.

3. The hydraulic valve as claimed in claim 1, wherein the closing of said shutters is controlled so that said operating shutter is first closed gradually, followed by a gradual closing of said by-pass shutter.

4. The hydraulic valve as claimed in claim 1, further including a spring biasing said fluid-operated actuator, whereby the closure-control of said shutters is carried out in a self-actuating manner by 5. The hydraulic valve as claimed in claim 1, wherein the engagement means of said by-pass shutter is an annular extension on the by-pass shutter which engages with an annular step formed in the end part of the operating shutter.

* * * * *